United States Patent
Sunderland et al.

(10) Patent No.: US 12,332,642 B2
(45) Date of Patent: Jun. 17, 2025

(54) FAULT TOLERANT INTERFACE FOR SAFETY CONTROLS

(71) Applicant: Parker-Hannifin Corporation, Cleveland, OH (US)

(72) Inventors: Ted W. Sunderland, Washington, MO (US); Nicolas G. Sparacello, Washington, MO (US); Zachary R. Wright, Wildwood, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 554 days.

(21) Appl. No.: 17/788,376

(22) PCT Filed: Mar. 29, 2021

(86) PCT No.: PCT/US2021/024552
§ 371 (c)(1),
(2) Date: Jun. 23, 2022

(87) PCT Pub. No.: WO2021/202322
PCT Pub. Date: Oct. 7, 2021

(65) Prior Publication Data
US 2023/0032795 A1    Feb. 2, 2023

Related U.S. Application Data

(60) Provisional application No. 63/001,621, filed on Mar. 30, 2020.

(51) Int. Cl.
*G05B 9/02*    (2006.01)
(52) U.S. Cl.
CPC ....................... *G05B 9/02* (2013.01)
(58) Field of Classification Search
CPC ........ G05B 9/02; H04Q 9/14; H04Q 2209/30; H04Q 2209/823; H04Q 9/00
See application file for complete search history.

(56) References Cited

U.S. PATENT DOCUMENTS

| 4,523,183 A | 6/1985 | Frick |
| 5,434,400 A | 7/1995 | Scherzer |

(Continued)

FOREIGN PATENT DOCUMENTS

| EP | 1230741 A4 | 4/2006 |
| WO | 0131801 A1 | 5/2001 |

(Continued)

OTHER PUBLICATIONS

International Search Report and Written Opinion of the International Searching Authority for corresponding International Patent Application No. PCT/US2021/024552, mailed Jun. 29, 2021.

(Continued)

*Primary Examiner* — Charles R Kasenge
(74) *Attorney, Agent, or Firm* — Renner, Otto, Boisselle & Sklar, LLP

(57) ABSTRACT

A fault tolerant interface includes a sensor and a safety control that are electrically connected to each other by a single wire. The sensor is configured to provide various signals to the safety control dependent on environmental parameters. Based on the ignal received by the safety control, the fault tolerant interface may act accordingly and place the overall system in a mitigative state in the event of a fault state or an alarm state. Data and fault or alarm states are detected by determining a first time interval between a first edge and a second edge of a signal, wherein an edge is one of a transition of the signal from a first voltage to a second voltage or a transition of the signal from the second voltage to the first voltage on a single wire. Data values versus fault or alarm states are assigned based on whether a current time interval corresponds to the first time interval or the second time interval, or another time interval associated with alarm or fault states.

18 Claims, 8 Drawing Sheets

(56) References Cited

U.S. PATENT DOCUMENTS

| | | | |
|---|---|---|---|
| 5,864,872 | A | 1/1999 | Lee et al. |
| 9,007,951 | B2 | 4/2015 | Reidl et al. |
| 9,424,849 | B2 | 8/2016 | Lesso et al. |
| 2007/0091518 | A1* | 4/2007 | Pullmann ............. H01H 47/002 361/23 |
| 2015/0074306 | A1 | 3/2015 | Ayyagari et al. |
| 2019/0385057 | A1 | 12/2019 | Litichever et al. |
| 2020/0089632 | A1 | 3/2020 | Graif et al. |

FOREIGN PATENT DOCUMENTS

| | | |
|---|---|---|
| WO | 2006044358 A2 | 4/2006 |
| WO | 2016206383 A1 | 12/2016 |

OTHER PUBLICATIONS

Anonymous, "The I2C-bus specification 2.1," Jan. 1, 2000, XP030001520, sections 12, 13, 15.

International Preliminary Report on Patentability from the International Preliminary Examining Authority for corresponding International Patent Application No. PCT/US2021/024552, mailed Mar. 18, 2022.

* cited by examiner

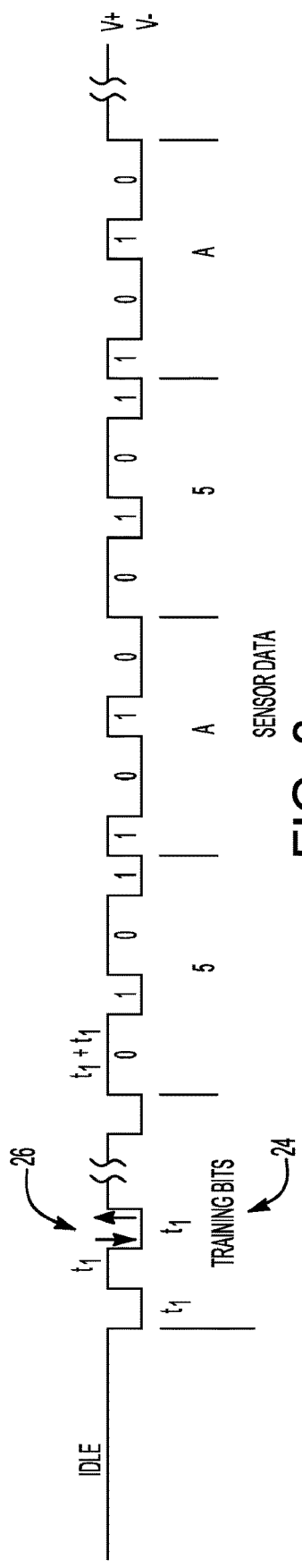
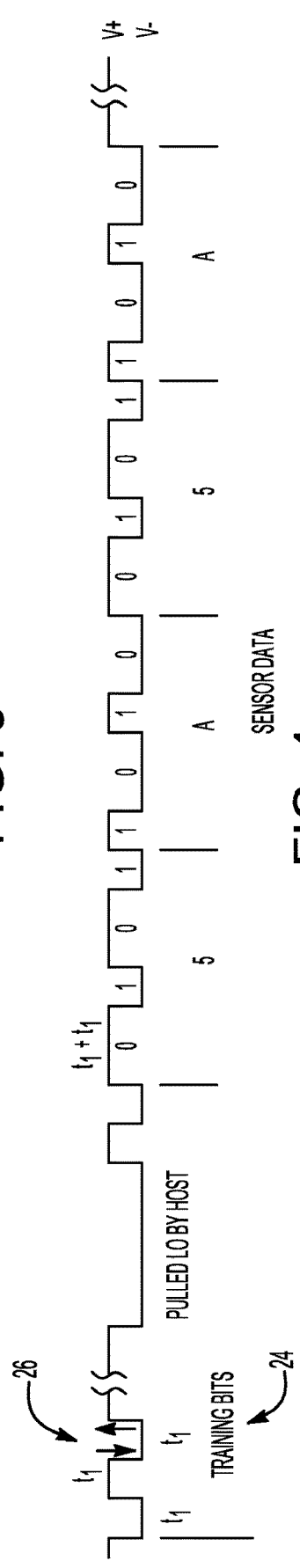
FIG. 3
FIG. 4
FIG. 5

FAULT TOLERANT INTERFACE FOR SAFETY CONTROLS

This application is a national phase of International Application No. PCT/US2021/024552 filed Mar. 29, 2021, which claims priority to U.S. Application No. 63/001,621 filed Mar. 30, 2020, each of which is hereby incorporated herein by reference in its entirety.

FIELD OF INVENTION

This application relates generally to systems and methods for safety controls, and more particularly to systems and methods for improved alarm condition and fault condition detection in safety control devices that employ remote sensing devices, such as for use for example in flammable and/or toxic refrigerant systems.

BACKGROUND

Safety controls, such as those defined as Protective Electronic Circuits (PEC) by Underwriters Laboratories, must continue to perform their safety function when faults occur in a safety control system. The use of flammable and/or toxic refrigerants in heating and cooling systems requires the use of failsafe mechanisms such as safety controls to prevent or mitigate build-up of leaked refrigerant vapor in an enclosed area. Refrigerant systems may use sensors to ensure concentration levels of refrigerant remain below specified limits. This becomes problematic when remote intelligent sensing devices (ISDs) that provide sensed data critical to the safety control operation are employed.

ISDs typically require communication interfaces requiring multiple wired connections that are susceptible to electromagnetic interference (EMI). In addition, the communication interface for an ISD typically requires complex bidirectional data communication support and cannot tolerate shorts to a supply voltage or a ground. These characteristics present a multitude of fault modes making implementation in the safety control system costly and complex. Also, the interfaces employed support only one mode of signaling to a host safety control forcing connected ISDs and the host safety control to be application specific. Existing power-line communication systems may provide a system in which ISDs and controls communicate over a combination power and data line using only two wires and, often, a proprietary protocol. A power-line communication system may use cabling that is formed to reduce the possibility of mis-wiring, and that meets standards for EMI immunity. However, controls and sensors must be designed to meet bus standards, such as the Actuator Sensor interface (ASi) standard, and require specialized power supplies to filter the data from the power. Other standards such as RS-485, I2C and SPI increase the number of wired connections, increase the complexity of implementation for noise immunity, and require protection against mis-wiring.

Accordingly, there remains a need for further contributions in this area of safety controls.

SUMMARY OF INVENTION

The application relates to providing more reliable and robust signaling between an ISD and associated control. Aspects of the invention include a multi-functional single wire interface for ISDs deployed in safety control systems. The interface provides for voltage level indication of alarm and fault conditions with embedded bidirectional serial communication for transmitting data corresponding to sensed values of an environmental parameter. The interface provides means for the connected safety control to detect a disconnected or mis-wired sensor as well as an open or shorted signal wire. The data is formatted such that sensor health and absence of a sensed alarm condition can be discerned by the connected safety control without the need to decode the embedded data corresponding to sensed values of the environmental parameter.

The ability of the interface to support the transmission of data corresponding to sensed values of the environmental parameter, the presence of the alarm or sensor fault condition, as well as all wiring fault conditions, allows the safety control device to perform its control action in response to all physical and electrical operating states of the sensor using a single wire.

A fault tolerant interface includes a sensor configured to provide a signal corresponding to an environmental parameter, wherein the sensor operates in one of a normal state, or an alarm or fault state; and a safety control communicatively coupled to the sensor via a single wire, the safety control configured to transmit serial data to the sensor and receive serial data from the sensor via the single wire in the normal state, wherein the safety control is further configured to detect the alarm state or the fault state prior to decoding the serial data. The safety control is configured to determine a data bit associated with a time interval between changes in a voltage level detected on the single wire, the time interval constituting an interval between a rising edge and a falling edge of the voltage level. The safety control transmits training bits to define a time interval associated with the data bit, and a second time interval corresponding to a multiple of the time interval defines a second data bit. Alarm and fault states may be detected as an extended time interval without a rising or falling edge being detected.

A method of single wire communication includes determining a first time interval between a first edge and a second edge of a signal, wherein an edge is one of a transition of the signal from a first voltage to a second voltage or a transition of the signal from the second voltage to the first voltage on a single wire; assigning a first character value to the first time interval; assigning a second character value to a second time interval associated with a multiple of the first time interval; and detecting a plurality of characters. The bit detection is performed by: detecting a pair of edges and determining a current time interval between edges; determining whether the current time interval is associated with one of the first time interval or the second time interval; and assigning the bit value that corresponds to the current time interval based whether the current time interval is the first time interval or the second time interval. An additional configuration exists that includes a third time interval, which is used as an idle normal state to specify the time base of the communication. The method further may include detecting an alarm condition corresponding to the first voltage at a continuous level for an alarm time interval, and detecting a fault condition corresponding to the second voltage at a continuous level for a fault time interval.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the

BRIEF DESCRIPTION OF THE DRAWINGS

FIG. 3 shows a timing diagram showing a normal state in which no alarm state or fault state is detected.

FIG. 4 shows a timing diagram showing an alternative embodiment of the normal state in which no alarm state or fault state is detected.

FIG. 5 shows a timing diagram showing an alarm state of a single sensor.

DETAILED DESCRIPTION

The following detailed description and appended drawings describe and illustrate various exemplary embodiments of the invention. The description and drawings serve to enable one skilled in the art to make and use the invention and are not intended to limit the scope of the invention in any manner. With respect to the methods disclosed, the steps presented are exemplary in nature, and thus, the order of the steps is not necessary or critical.

Figure 1:
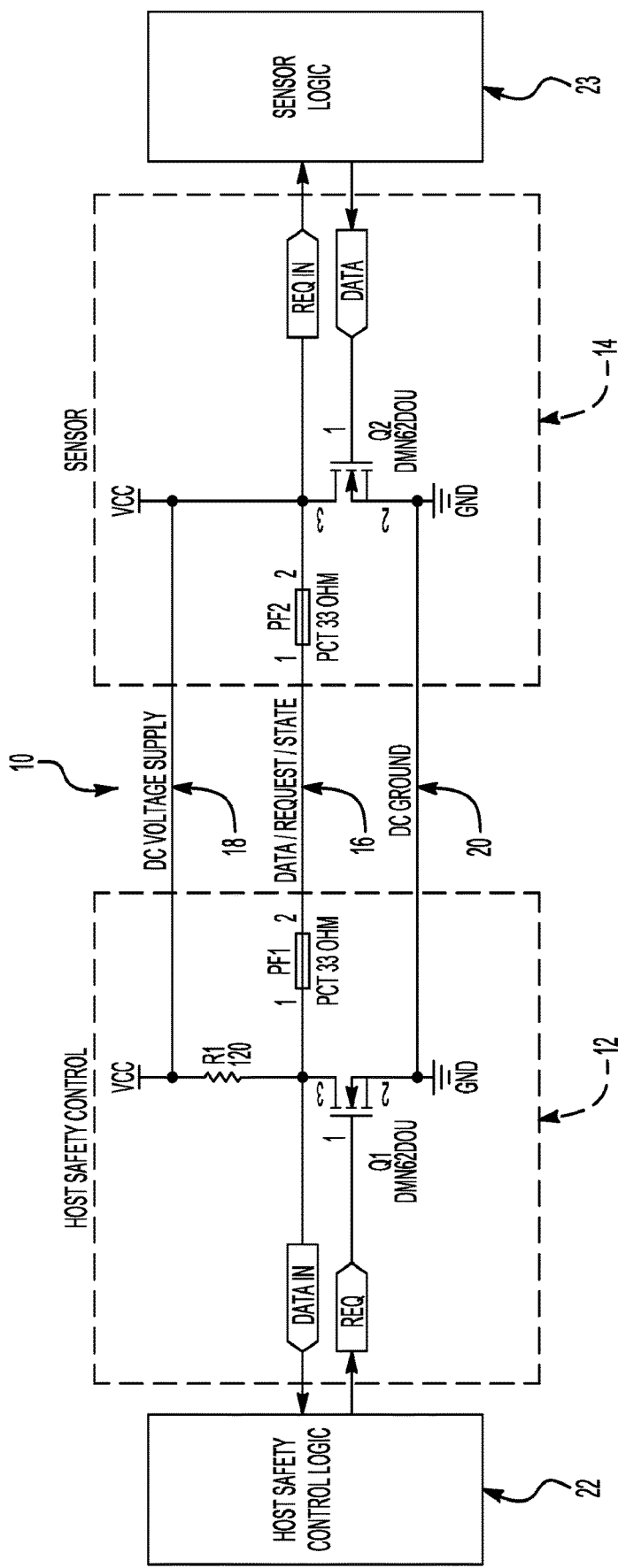
FIG. 1 is an electrical control circuit schematically illustrating a configuration for a multi-functional single wire interface according to an embodiment.

Referring to FIG. 1, embodiments of the current application relate to a multi-functional single wire interface 10 suitable for intelligent sensing devices (ISDs) deployed in safety control systems, such as when a refrigerant level exceeds a predetermined threshold activating an alarm or a fault status. The multi-functional single wire interface 10 may be incorporated into a single package to provide detection and mitigating action for various systems. For example, a host safety control 12 and a sensor 14 may be implemented to provide required sensing and detection actions as defined in various safety standards, such as UL 60335-2-40 Annex GG for Electrical Heat Pumps, Air-Conditioners and Dehumidifiers, or others. For heating, ventilation and air conditioning (HVAC) systems, the host safety control 12 and the sensor 14 may be configured to detect, via signals on the multi-functional single wire interface 10, an alarm state based on a sensed concentration of refrigerant gas in the ambient air and transmit a signal to a safety system configured to execute a desired mitigating action.

An embodiment of the present application includes the multi-functional single wire interface 10 that is generally comprised of the host safety control 12 and the sensor 14, wherein the host safety control 12 and the sensor 14 are electrically coupled by an open drain/collector output and low impedance single signal wire 16. FIG. 1 depicts a single sensor 14 coupled to the host safety control 12, but as further detailed below a plurality of sensors may be coupled to the host safety control 12 within the multi-functional single wire interface 10, with multi-sensor operations being described in greater detail below.

The host safety control 12 includes a low impedance pull up resistor R1 to a DC voltage supply 18. The host safety control 12 may control a voltage on the signal wire 16 by control of a transistor Q1. The sensor 14 transmits data and signals indicating an operating state by control of a transistor Q2. The sensor 14 may control a voltage on the signal wire 16 by control of a transistor Q2. The data line is protected from shorts to a ground 20 or the voltage supply 18 by PTC thermistors PF1 and PF2 of the host safety control 12 and the sensor 14, respectively.

A mitigating action is assumed to be necessary when at least one of an alarm state or a fault state is detected by the host safety control 12 via the signal wire 16, wherein the signal received by the host safety control 12 is transmitted from the sensor 14. When the alarm state is active (as shown in FIG. 5 described in more detail below), the host safety control 12 may request that the sensor 14 transmit sensed data by momentarily activating the REQ pin to turn on transistor Q1, thereby putting the data interface line in a 0V (LO) condition. The sensor 14 may detect the request via the REQ_IN pin and, in response begin transmitting data. The data may include data corresponding to sensor operational status or sensed values of an environmental parameter such as temperature, pressure, gas concentration, particulate concentration, and the like.

Figure 2A:
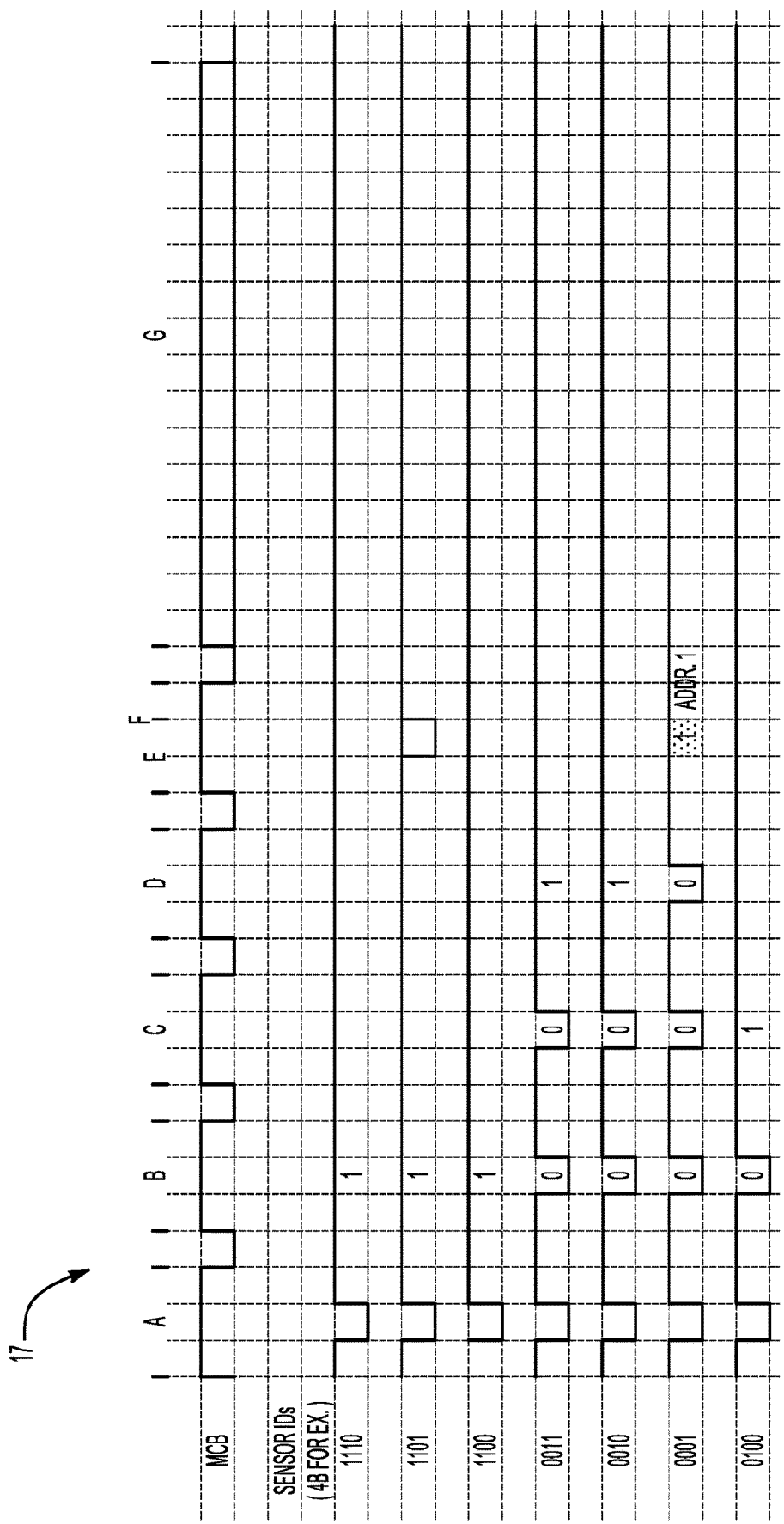
FIG. 2 is a timing diagram showing an addressing of a plurality of sensors.
Figure 2B:
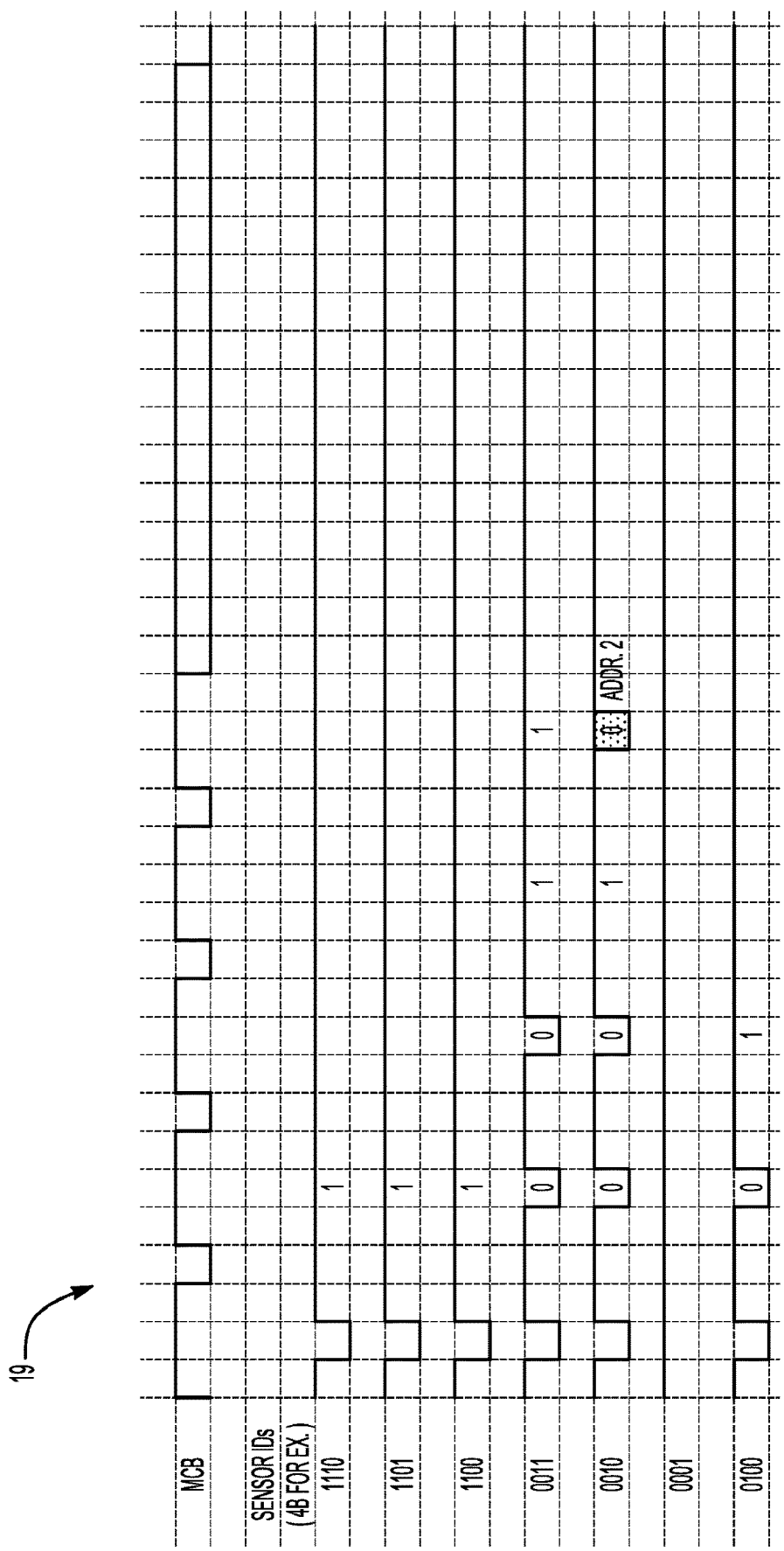
Figure 2C:
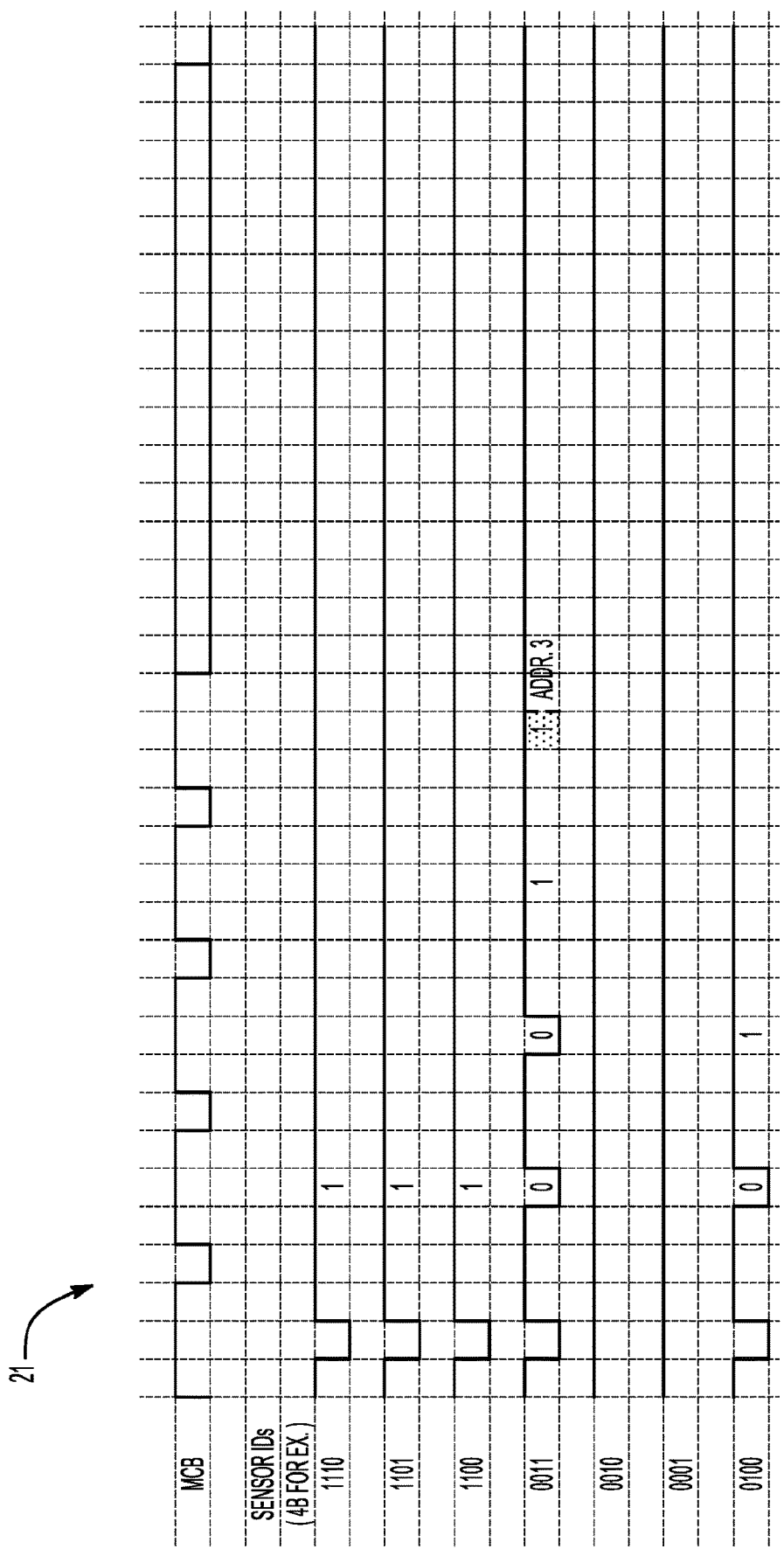

As referenced above, FIG. 1 illustrates only a single sensor 14, but a plurality of sensors may be coupled to the host safety control 12 each of which is communicative with a sensor logic 23. Each signal receiving entity of the multi-functional single wire interface 10 is provided an individualized address. When a plurality of sensors is employed, each sensor is uniquely addressed for individualized access. The individualized addressing of the plurality of sensors is shown in FIG. 2. Here, the plurality of sensors is provided an associated unique 96-bit value that is individualized for each of the plurality of sensors. The addressing process begins with a host safety control logic 22 outputting a signal polling for un-addressed sensors. This polling continues until each of the un-addressed sensors acknowledges its state, and the host safety control logic 22 registers the acknowledgement from each of the un-addressed sensors. The host safety control logic 22 then searches for the lowest numbered identified sensor and sends a message assigning an individualized address to the lowest available address that corresponds to the lowest unique identification. This process continues until each of the un-addressed signals is provided a unique address, as indicated by reference numerals 17, 19, and 21, respectively in FIG. 2. Each of the unique addresses is then logged by the host safety control logic 22.

During normal operation, i.e., a normal state, a given sensor 14 transmits the data corresponding to sensed values of the environmental parameter via the signal wire 16 to the host safety control 12 using a binary signaling scheme. The transmission of sensed data may be initiated by the sensor 14 at fixed intervals asynchronous to the host safety control's 12 operation. The data is transmitted on the signal wire 16.

FIG. 3 shows an exemplary timing diagram of the multi-functional single wire interface 10 for a sensor-initiated communication in a normal state, in accordance with an embodiment of the present application. The sensor 14 may be configured to transmit data on a fixed interval with a fixed idle time between messages. Alternatively, the sensor 14 may be configured to supply training pulses continually without employing an idle time. The host safety control 12 is configured to detect rising and falling edges when a signal on the signal wire 16 transitions between a first voltage and a second voltage. To transmit data, a series of training bits 24 is transmitted by the sensor 14 to notify the host safety control 12 that the sensor 14 is preparing to send data. The host safety control 12 measures and stores the duration, $t_1$, between edges of each training bit. The stored duration, $t_1$, may represent a binary 1 bit. The duration of a binary 0 bit may be a multiple of the training bit, such as approximately two times the duration of a 1 bit, i.e., $t_1+t_1$. The host safety control 12 may apply a tolerance to the duration such as +/−0.5 bit. The duration of additional characters may be any multiple of the duration, $t_1$, of each training bit. In this manner, communication is timed from the training bits to define the 1 versus 0 bits. The triggering of this determination, again, is based on detecting rising and falling edges and measuring the duration between such edges, which differs from conventional configurations that are based on voltage level magnitude measurements. Edge triggering to define the data bits provides a more effective manner of communication as compared to communication based on voltage level measurements.

The binary bits are fixed-time and/or clock independent and are demarcated by a change in a voltage level 26 as indicated by the rising and falling edges. Since each data bit is represented by the period between rising and falling edges, extended high and low levels on the signal line is eliminated. This reduces bit error due to external noise, as contiguous data bits of the same value do not present long periods of the same voltage state on the data line, which are more susceptible to electro-magnetic interference that could disrupt the data. Additionally, the binary 1 bit may be associated with any time interval less than the duration, $t_1$, of each training bit, and the 0 bit may be associated with a second time interval greater than a multiple of the duration, $t_1$, of a training bit such as 1.5 to two times the training bit duration. The bit timing relationship provides wide tolerance in changes in transmission speed. Furthermore, representing data by the time interval between rising and falling edges allows additional characters to be represented by various multiples of the duration, $t_1$, such as when providing additional command signals. The host safety control 12 may be programmed to decode and use the sensed data for initiating safety functions, or simply use the data pulses and fixed idle time as an indication that the sensed value has not traversed a predetermined safety limit without processing the sensed parameter data.

FIG. 4 shows another exemplary timing diagram for the multi-functional single wire interface 10 for a host safety control-initiated communication in a normal state. The sensor 14 may be configured such that in normal operation the sensor 14 sends training bits 24 until the line is pulled LO by the host safety control 12. Once the line is released, the sensor 14 will transmit the data corresponding to sensed values of the environmental parameter and then return to sending idle training bits 24. In this configuration, the host safety control 12 may use training bit duration, $t_1$, to define binary 0 bit as being any time interval between changes in a voltage level greater than $2*t_1$, and a binary 1 bit as being any time interval between changes in a voltage level less than $0.5*t_1$. This definition of 1 versus 0 bits allows the training bits to be distinguished from data bits. The host safety control 12 may be programmed to decode and use the sensed data for initiating safety functions, or simply use the training pulses as an indication that the sensed value has not traversed a predetermined safety limit without requesting or processing the data.

FIG. 5 shows an exemplary timing diagram for the multi-functional single wire interface 10 for communication in an alarm state. The signal wire 16 may be used as a state indicator. The sensor 14 may be configured to provide a continuous high level at a first voltage level (V+) on the signal wire 16 to indicate an alarm state, i.e., the alarm time interval constitutes an extended time interval relative to the training bit in which the host safety control's 12 edge detection, circuit or logic, would not detect any voltage change that would be associated with a duration between edges indicative of a training bit or data bit. The continuous high level for the alarm time interval thus constitutes an extended time interval that may exceed the fixed idle time described in relation to the timing diagram of FIG. 3 or may interrupt the training bits 24 described in relation to the timing diagram of FIG. 4. For example, the fixed idle time may be 100 milliseconds, and if exceeded, the host safety control 12 detects an alarm state as signaled by the sensor 14.

In response to detecting the continuous high level for the extended alarm time interval, the host safety control 12 may determine the sensor 14 is indicating an alarm state and request the current sensed data by activation of the REQ pin and pulling the signal LO for a predetermined time, as shown in FIG. 5. The sensor 14 may detect the signal from the REQ pin and, in response, send data to the host safety control 12 corresponding to the sensor 14 data further illustrated in FIG. 5. A sample message may include a value corresponding to a concentration of a gas, a temperature, a pressure, sensor operational status, and the like. The host safety control 12 may process the value to determine if the alarm state is valid. If the sensor 14 does not respond to the signal from the REQ pin by sending usable data, the sensor 14 maintains the continuous high level, and/or if the host safety control 12 does not detect data after the signal from the REQ pin is received, the host safety control 12 may determine the alarm state is valid. Thereafter, the host safety control 12 may execute an action in response to the detected alarm state, such as transmit alarm data or an alarm control signal to an associated safety or mitigation system.

When multiple sensors are employed with control over the single communication line, individual sensor signal activity must be prioritized so that more imminent or significant issues are handled with higher priority. For example, the detection of an alarm state would require more imminent action than detection of a normal operation state, or detection of a less significant state such as addition of a sensor or a sensor address change. In general, a first priority check is made in connection with a sensor state, such as whether or not a sensor is in an alarm state or other state, with the various states being assigned a priority order. If two or more sensors are in a same state (and thus have the same state priority), priority further proceeds based on sensor address, for example with a lower address being prioritized over a higher address. As each sensor is associated with a unique address, a combination of a prioritized sensor state with a sensor address provides a unique priority ordering that still favors higher priority states.

Figure 6:
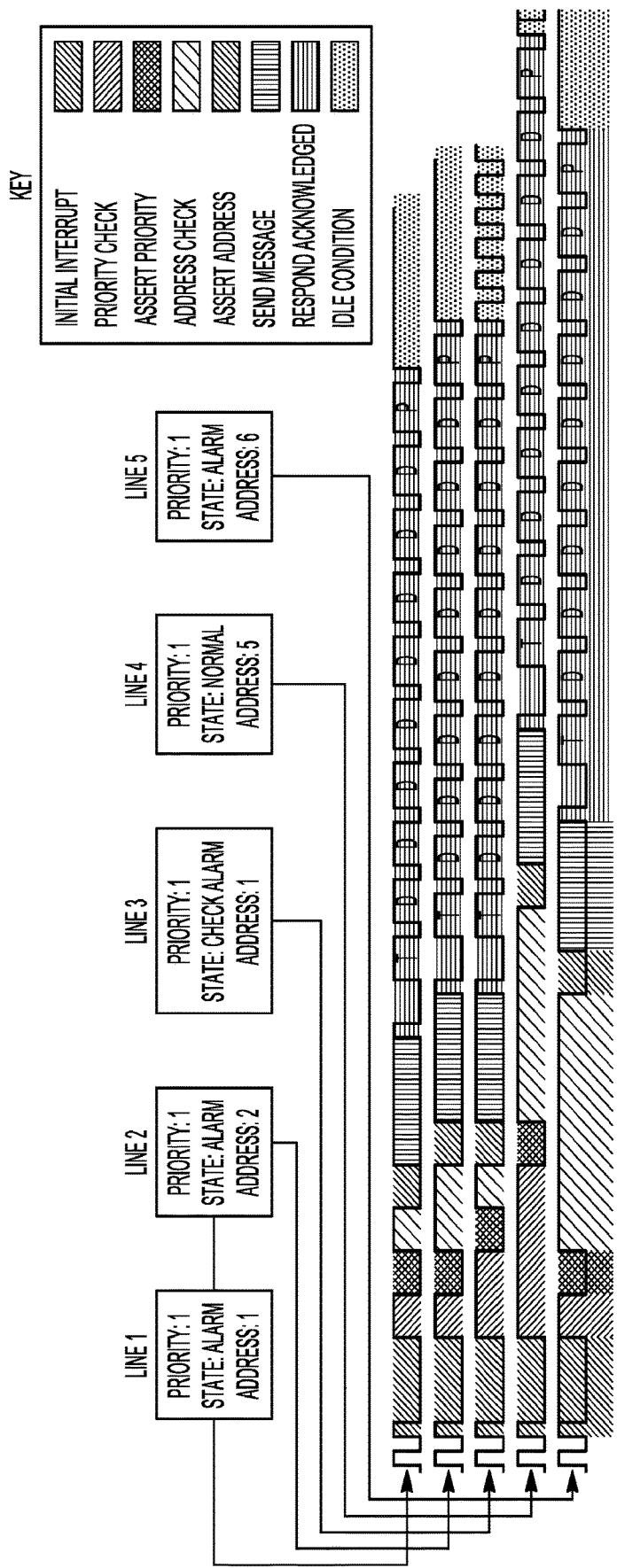
FIG. 6 shows a timing diagram showing various signal states, including the alarm state, of a plurality of sensors.

FIG. 6 shows an example timing diagram that is expanded based on the timing diagrams of FIGS. 3-5, wherein a plurality of sensors is implemented in the multi-functional single wire interface 10, rather than the single sensor 14 depicted in FIG. 1. Due to the necessity of fault detection on open or shorted communication circuits, the normal line condition is training pulses. One device must always be "in control" of the line to maintain the training pulses and not override an intentional steady HI or LO state. Additionally, the system must be able to dynamically change which device is in control and not have a static "master" device. Given the dynamic system of determining control of the line, priority must be given to ensure important messages, such as alarm conditions, will be sent. Additionally, a system must be implemented to ensure that data collisions do not occur due to separate devices attempting varying control over the line.

To implement this, multiple priority levels and addresses are depicted in FIG. 6 that are associated with various states, which for example correspond to a normal state, a check alarm state, and an actual alarm state. Reference is made to the Key provided in FIG. 6. The signal for each of the states is implemented using an initial interrupt from the host safety control 12 that pulls the communication line LO for a predetermined multiple of the training pulse(Initial Interrupt regions), until the signal implements a priority check on the priority of each of the signals, at which point the signal line is released (Priority Check regions). An assertion based upon the registered priority of the state of the attached sensors pulls the line LO (Assert Priority regions), wherein the sensor state that has the highest priority first is pulled LO. The address of each of the signals is then checked, and the line is released for each of the signals (Address Check regions). An assertion based upon the sensor's registered address pulls the line LO (Assert Address regions) and then a message is sent (Send Message regions). To verify the receipt of the message, the transmitting device sends the Response Acknowledged pattern. The receiving device uses the Start, Data, and Stop (T, D, and P) pulses as an opportunity to respond. T and P may serve as Start and Stop bits of value 0 while D serves as a confirmation message. The recipient of the message may pull the middle third of the pulse LO for data 0 or leave it HI for data 1. The transmitting device may check the Start, Stop and Data bits to verify accurate receipt of the message. Each of the signals is then returned to an idle condition (Idle Condition regions), wherein the idle condition for the alarm state is a long-duration HI (see rows 1, 2, and 5) versus training bit transmission of a normal operation (see rows 3 and 4), which is comparable as is depicted in FIG. 5 (alarm state) as compared to FIG.s 3 and 4 (normal operation). In each case when a device transmits a signal, the line is left in an idle condition for a predetermined amount of time, which allows for new sensors to have the ability to determine a time-base while allowing the host safety control logic 22 to monitor the pulsed line levels for redundant state indications.

As referenced above, different states are assigned a different priority level for control by the host safety control 12. The following provides an example of priority ordering of states that may be experienced by one or more of the sensors:

1. Alarm state;
2. Fault state;
3. Check alarm state;
4. Addressing;
5. New sensor;
6. Poll;
7. Data response;
8. Request data; and
9. Change address.

As also referenced above, in consideration of the example priority levels, when two sensor devices are attempting to transmit the same priority message, i.e., two sensors are in the same state, the sensor device with the lower address is given priority such that the combination of state priority level and address priority results in one unique device being given control of the communication line. A device in control of the communication line retains control until a different device takes control using the defined Priority and Address checks described above. If a device registers that the line is pulled LO during the Priority Check, or Address Check before that device's own Assertion, the device loses the priority check and stops attempting to communicate during the current message block.

The unique address is obtained by utilizing one device operating as an address server with all other devices assumed to have a unique identifier (UID). FIG. 2 shows an example using a 4-bit UID, but a typical application will use a longer UID such as a 96-bit or 128-bit UID that come with IC/Microcontroller components, or a random number of a sufficient length to provide reasonable confidence that the UID will be unique in a given system. A message priority is defined for the address server to be used to poll for unaddressed sensors. After initiating a message to poll for addresses, the "Send Message" portion of FIG. 6 is shown in the MCB line of the drawings in FIG. 2. Block A is the initial poll for unaddressed sensors. If any unaddressed sensor exists on the line, it pulls the line low during the middle third of pulse A. The address server will see the line go low and know that at least one unaddressed sensor exists. Pulses B-E are used to identify the lowest UID among the unaddressed sensors. The number of pulses should match the number of bits in the UID, for example there are four pulses matched with four bits here. At pulse F, the address server knows the UID of the lowest unaddressed device and can transmit an address assignment in G. During pulses B-E, devices are given an opportunity to provide feedback to the address server by pulling the line LO during the middle third of the pulse. Pulling the line LO is interpreted as a 0 and leaving the line HI is interpreted as a 1.

Devices that could possibly be the lowest UID transmit their UID starting with the most significant bit at pulse B and ending with the least significant bit at pulse E. If the current bit for a device is 1, but control system finds that a different device has a 0 for the same bit, it knows that it is not the lowest and remains idle (line HI) for the rest of the current message (for example, after pulse C specifically in reference 17 of FIG. 2 the Sensor ID 0100 remains idle). By pulse E (the last bit of the UID), at most two devices are still being considered (for example, Sensor IDs 0010 and 0011 in reference 19 of FIG. 2, respectively). If a 0 is transmitted at pulse E, the device that transmitted the 0 is the lowest unaddressed UID and will be addressed by the address server. If a 0 is not transmitted, there will be only one device remaining and it will receive the address from the address server.

The highlighted bit adjacent to the "addr. 1" or "addr. 2" label in pulse E in each of the references 17, 19, and 21 is indicative of the line of the device that is to be addressed by the address server. Section G is used to transmit the pairing of the UID that was identified as the lowest unaddressed device and the new address assignment (for example, in reference 19 of FIG. 2, the pulse G may contain the bits {0010 10} where 0010 is the UID and 10 is the address assignment). The address server will continue polling for unaddressed devices until all devices have an address. This is advantageous in systems using large UIDs, for example if the devices have a 96-bit UID, and there are 255 devices in the system, only eight bits are needed in the unique address. Since the "Address Check" of FIG. 6 is proportional to the address value, it has a potential to grow exponentially in time with respect to address length. An 8-bit address results in a feasible address check which is bounded by a 2^8 multiplier relative to the training pulse while the 96-bit address is infeasibly bounded by a 2^96 multiplier relative to the training pulse.

With reference to each of the identified lines 1-5 in FIG. 6, each of the lines 1-5 is only transmitted in full if it is considered separate from the rest. Line 1 will never be interrupted. Line 2 will be terminated at the address assertion of Line 1. Line 3 will be terminated at the priority assertion of Lines 1, 2, or 5. Line 4 will be terminated by the priority assertion of Lines 1, 2, 3, or 5. Line 5 will be terminated by the address assertion of Lines 1 or 2.

Figure 7:
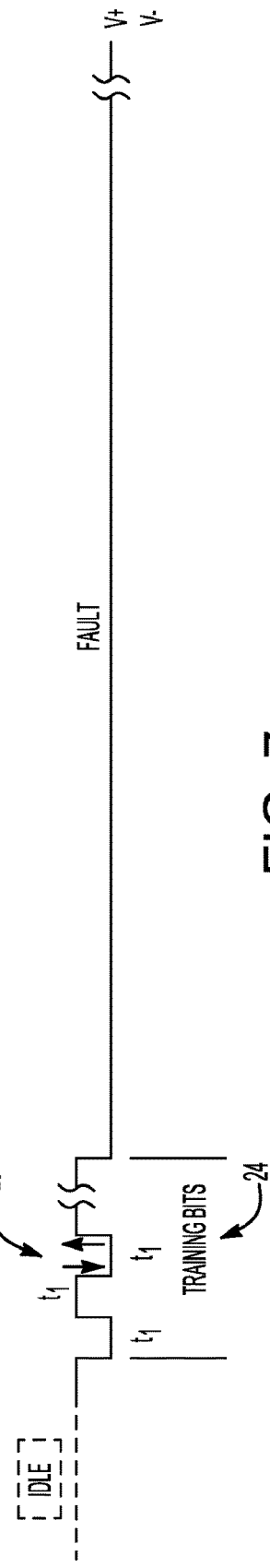
FIG. 7 shows a timing diagram showing a fault state of a single sensor.

In addition to normal operation and alarm states, a sensor also may experience a fault state in which the sensor(s) 14, via a self-test, determine that they have experienced a circuit fault. FIG. 7 shows an exemplary timing diagram for the multi-functional single wire interface 10 for communication in a fault state. The host safety control 12 interprets a continuous low level at a second voltage level (V−) on the signal wire 16 to indicate a sensor fault state. The fault time interval for the continuous low level of a fault state, comparably as the alarm time interval described above, is an extended time interval relative to the time interval associated with the initial idle time, data bit time interval, or can be asserted continuously for the duration of the fault condition. The sensor 14 and the host safety control 12 may be configured to transmit data in a normal state on a fixed interval with a fixed idle time between messages, or upon initiation by the host safety control 12. An intelligent sensing device (ISD) may be configured to detect one or more faults such as inaccurate sensed values. Thereafter, the sensor may pull the signal wire 16 to the continuous low level for the extended fault time interval to indicate a fault to the host safety control 12. Additionally, a grounded data line, or a power loss, may cause a continuous low level on the signal wire 16, which also would cause a situation in which a similar action from the host safety 12 would be initiated.

Accordingly, during a sensor fault condition the host safety control 12 is configured to detect the continuous low level on the signal wire 16. Thereafter, the host safety control 12 may execute an action in response to the detected fault state, such as transmitting fault data or a fault control signal to the associated safety system to perform a requisite mitigation operation. In some safety control systems, the fault data and/or the fault control signal may be the same as the alarm data and/or the alarm control signal.

Figure 8:
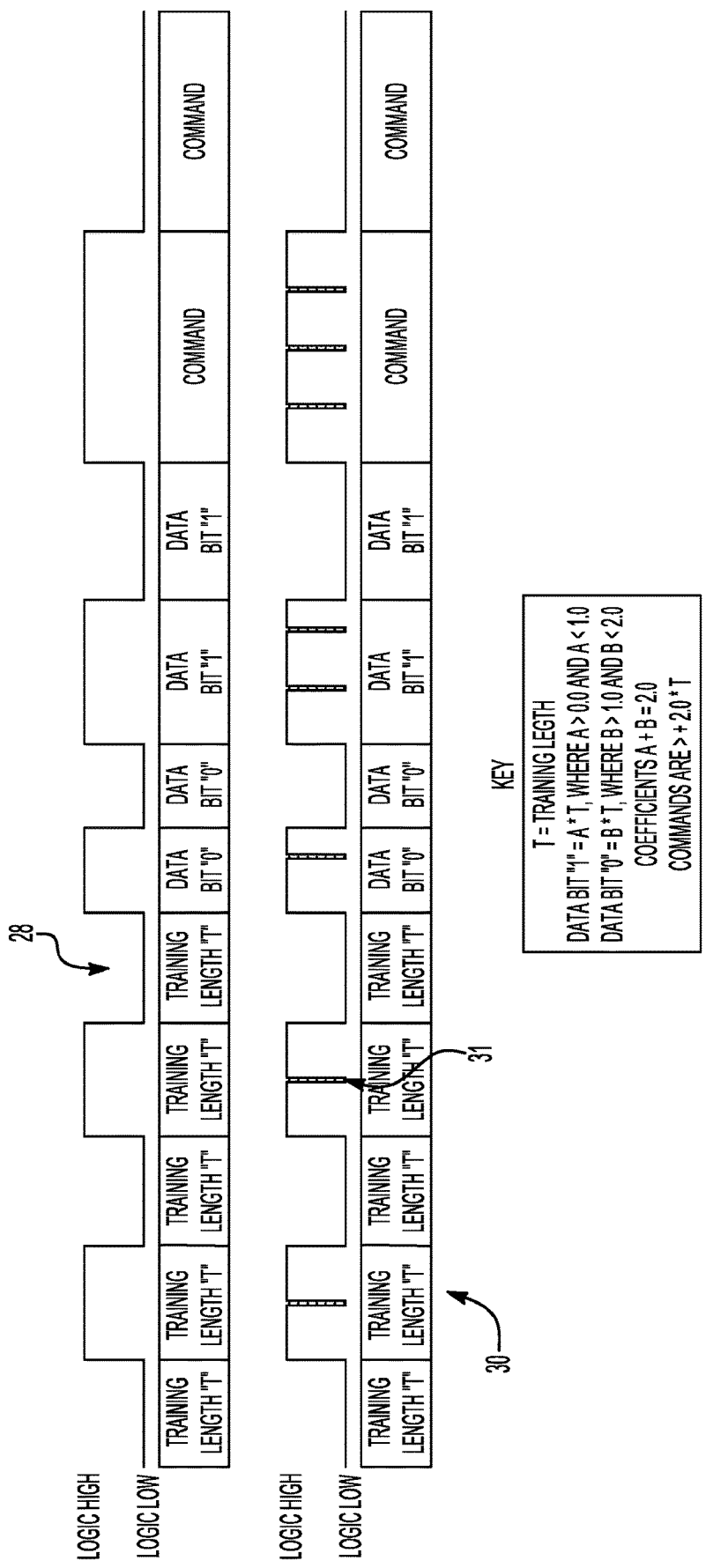
FIG. 8 shows an alternative timing diagram showing a normal state in which no alarm state or fault state is detected, as well as a timing chart showing blips in the timing diagram used for detecting "A" and "B" coefficients.

As referenced above, for normal operation in which data bits are transmitted, a 1-bit versus a 0-bit is determined based on an edge-to-edge duration relative to a duration of a training bit. In the above examples, a 0-bit has a duration that is a multiple less than one times a training bit duration whereas a 1-bit has a duration equal to a greater than one multiple (e.g., 1.1 to 1.9) the duration of a training bit. These multiples can be defined as the coefficients A and B, whereas a bit with length A*T is a 0-bit and a bit with length B*T is a 1-bit. FIG. 8 illustrates a method on the manner of determining the A and B coefficients using "blips" in a signal pulse. In particular, FIG. 8 shows a timing diagram 28 for the multi-functional single wire interface 10 that depicts a normal state similarly as described above. In contrast with the control of this embodiment, an additional timing diagram 30 is depicted demonstrating several blips 31 constituting signal interrupts that are transmitted when the signal line is HI at intervals of 0.5*T*n. In this embodiment, the A and B coefficients can be determined by counting the number of blips in a pulse and measuring the total time between the rising and falling edges of the pulse.

FIG. 8 illustrates a training bit length "T", a data bit "0", a data bit "1", and a command character. When the voltage level of a pulse is HI, blips are signaled at times which are multiples of 0.5*T. By measuring the length of the pulse and counting the number of blips 31, the A and B coefficients can be determined. For a pulse with a single blip, if the pulse length is less than T then the coefficient A is equal to "Pulse Length"/"Training Pulse Length" 30. Likewise, coefficient B can be calculated by the same equation when two blips are seen in a single pulse. Seeing more than two blips indicates that the pulse is a command character.

Figure 9:
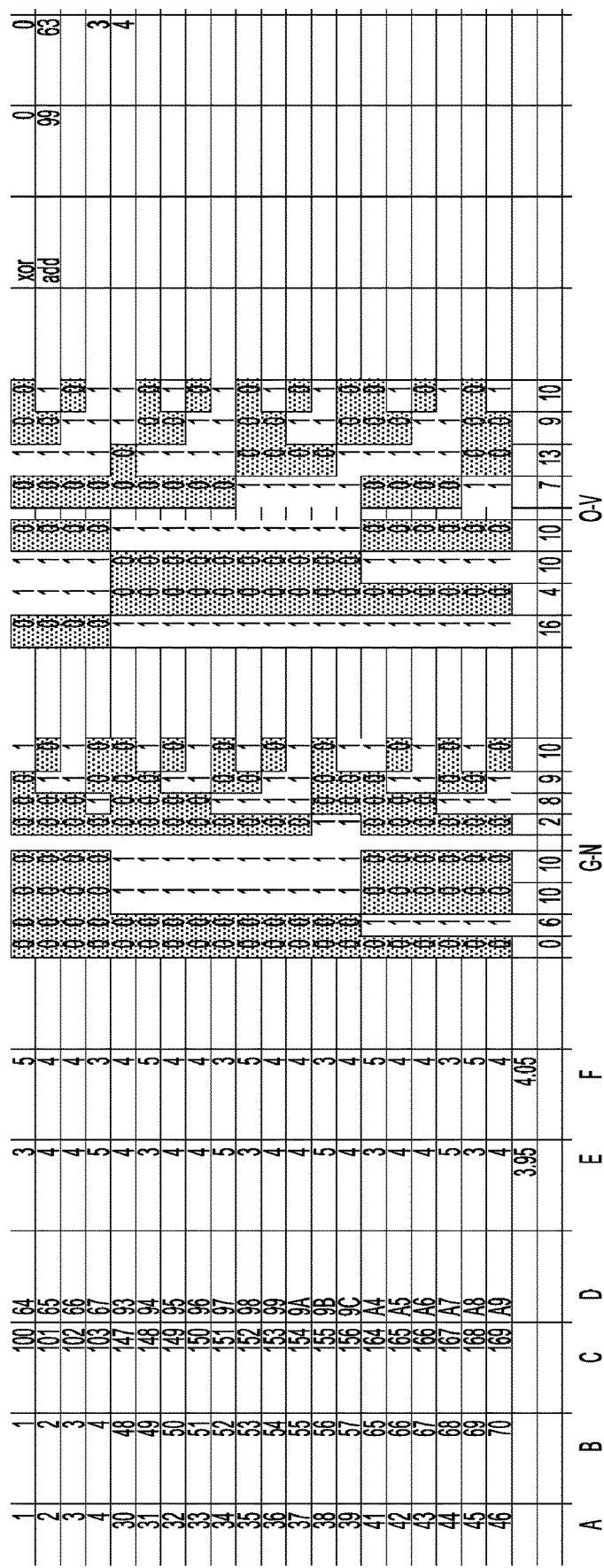
FIG. 9 shows a collection of bits that dynamically teach a host safety control the various signals.

Because the host safety control 12 must receive training bits to learn the addresses and associated signals according to each respective sensor, the 0s and 1s pulsed to the host safety control 12 must be distinct to avoid error. Accordingly, training bit definition, and the related definition of 1s and 0s relative to the training bit, should be uniform and accurate. FIG. 9 illustrates a manner by which the host control device 12 can calculate the duration of 0 and 1 data bits by averaging a number of periods between rising and falling edges in a data stream. This average period defines the training bit period.

Referring to FIG. 9, columns A and B represent a subset of ASCII characters that are an exhaustive list of data byte values used in a data exchange between sensor(s) 14 and the safety host control 12, with column A being a hexadecimal value and column B being a corresponding decimal value. To normalize these values, a reversible arithmetic and/or logical operation or sequence of operations is applied to the value. For this implementation, a decimal 99 is added to each value (or analogously a 63 hexadecimal value is added), resulting in the normalized values shown in column C (decimal) and column D (hexadecimal). The binary representations of the original values are shown in columns G-N, and binary representations of the normalized values (dec+99/hex+63) are shown in columns O-V, and the total number of 1s for these data values are shown at the bottom of these columns. Columns E and F respectively constitute the average number of 1s and 0s from the normalized values shown in columns O-V. Columns E and F, once normalized show that the average number of 1s and 0s are very close to each other, approximately four in this example.

For any selection of a training bit, 1-bit, and 0-bit lengths, a specifically weighted average of 1-bit and 0-bit lengths will equal the training bit length. For this example, a training bit is defined as time T, a 1-bit is defined as 1.2 T, and a 0-bit is defined as 0.8 T. A 1:1 average of 1-bit and 0-bit lengths equals T. The 1:1 average is what drives the desire for equal representation of 1s and 0s in the normalized data set, but the distribution of 1-bit and 0-bits may be altered by changing the reversible arithmetic and/or logical operation to match the desired weight of 1-bit length and 0-bit lengths relative to the training bit. By averaging a sufficiently long string of data, the system may confidently determine a working training pule length prediction, $\hat{T}$, where all pulses longer than $c_1 \times \hat{T}$ are accurately read as a 1-bit and all pulses shorter than $c_2 \times \hat{T}$ are accurately read as a 0-bit and the remining pulses between $c_1 \times \hat{T}$ and $c_2 \times \hat{T}$ in length are accurately read as training bits. The initial $\hat{T}$ prediction is sufficient for system operation but may be refined by averaging only training bits at this point.

In another exemplary embodiment, the host safety control 12 may be a non-intelligent device configured to monitor the signal wire 16. The host safety controller may monitor the signal wire 16 for pulses, and if the pulses stop (e.g., the signal is at the continuous HI/LO level), the host safety control 12 can signal that the multi-functional single wire interface 10 has detected an alarm state. In this embodiment, the signal transmitted by the intelligent sensing device may be processed by a microcontroller or other device in another part of the system.

In a safety critical system, the host safety control 12 determines and/or transmits a signal to initiate similar system responses to both alarm and sensor fault states. The state indicator, e.g., alarm and fault, improves detection of alarm and fault states. For example, a disconnected sensor, a shorted data line to V+, a grounded data line, and/or a power loss to the sensor 14 all result in the host safety control 12 detecting a continuous HI/LO on the signal line denoting an alarm state or fault state. Upon detecting the state, the host safety control 12 may initiate the corresponding mitigating action without decoding any data transmitted by the sensor 14. Because the host safety control 12 is configured to detect an alarm state and/or a fault state without relying on the data, the host safety control 12 response is faster and more reliable than existing technologies allowing for a less complex host safety control 12 than would otherwise be required.

Although some embodiments have been discussed in terms of the alarm state corresponding to a continuous HI level and the fault state corresponding to a continuous LO level, it should be understood that any value may be assigned to alarm or fault states. Thus, the continuous HI/LO level is not intended to denote a specific, continuous voltage, but to encompass an electromagnetic signal near a specified value subject to fluctuations due to noise and other circuit characteristics. One of ordinary skill in the art would recognize many variations, modifications, and alternatives. Additionally, circuit elements may be added to the fault tolerant interface for safety controls of FIG. 1 for various purposes of specific applications. One of ordinary skill in the art would recognize many variations, modifications, and alternatives.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above-described elements (components, assemblies, devices, compositions, etc.), the terms (including a reference to a "means") used to described such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fault tolerant interface, comprising:
    a sensor configured to provide a signal corresponding to an environmental parameter, wherein the sensor operates in one of a normal state, or an alarm or fault state, wherein the signal corresponds to one of the normal state, or the alarm state or the fault state, wherein a value associated with the signal is predetermined; and
    a safety control coupled to the sensor via a single wire, the safety control configured to transmit serial data to the sensor and receive serial data from the sensor via the single wire in the normal state, wherein the safety control is further configured to detect the alarm state or the fault state based on the signal prior to decoding the serial data;
    wherein the safety control is configured to determine a data bit associated with a time interval between changes in a voltage level detected on the single wire, the time interval constituting an interval between a rising edge and a falling edge of the voltage level; and
    wherein the safety control and sensor each transmits training bits to define the time interval associated with the data bit.

2. The fault tolerant interface of claim 1, wherein a second time interval corresponding to a multiple of the time interval defines a second data bit.

3. The fault tolerant interface of claim 1, wherein the time interval is distinct from the defined second time interval and a third time interval, the third time interval corresponding to a second multiple of the time interval and defining a third data bit.

4. The fault tolerant interface of claim 1, wherein the alarm state is associated with a first voltage level detected for an alarm time interval that is an extended time interval relative to the training bit, data bit and the third data bit.

5. The fault tolerant interface of claim 1, wherein the fault state is associated with a second voltage level detected for a fault time interval that is an extended time interval relative to the training bit, data bit and the third data bit.

6. The fault tolerant interface of claim 1, wherein the safety control is configured to output a safety control command in response to detecting at least one of the alarm state or the fault state.

7. A method of single wire communication comprising:
    determining a first time interval between a first edge and a second edge of a signal provided by a sensor, wherein the sensor operates in one of a normal state, or an alarm or fault state, wherein the signal corresponds to one of the normal state, or the alarm state or the fault state, wherein a value associated with the signal is predetermined, wherein an edge is one of a transition of the signal from a first voltage to a second voltage or a transition of the signal from the second voltage to the first voltage on a single wire;
    assigning a training pulse value to the first time interval;
    assigning a first bit value to a second time interval, which is a multiple of the first time interval;
    assigning a second bit value to a third time interval associated with a second multiple of the first time interval; and
    detecting a plurality of characters, wherein the detection is performed by:
        detecting a pair of edges and determining a current time interval between edges;
        determining whether the current time interval is associated with one of the first time interval, the second time interval or the third time interval; and
        assigning the bit value that corresponds to the current time interval based on whether the current time interval is the first time interval, the second time interval or the third time interval.

8. The method of claim 7, further comprising a safety control coupled to the sensor via the single wire, the safety control configured to transmit serial data to the sensor and receive serial data from the sensor via the single wire in the normal state, wherein the safety control is further configured to detect the alarm state or the fault state based on the signal prior to decoding the serial data.

9. The method of claim 7, wherein when more than one sensor is providing a signal each sensor is provided a unique address, and priority is given to a sensor that has a higher priority state, and as between sensors having a same priority state priority is given to the sensors in order of address.

10. The method of claim 7, wherein the safety control transmits training bits to define the time interval associated with a data bit, and the sensor transmits training bits to define the time interval associated with the data bit.

11. The method of claim 7, wherein the safety control is configured to output a safety control command in response to detecting at least one of the alarm state or the fault state.

12. The method of claim 7, further comprising detecting an alarm condition corresponding to the first voltage at a continuous level for an alarm time interval, and detecting a fault condition corresponding to the second voltage at a continuous level for a fault time interval.

13. The method of claim 7, wherein data is represented by the time interval between the first edge and the second edge allowing additional characters to be represented by various multiples of a duration of the time interval.

14. A fault tolerant interface comprising:
a system for providing real-time feedback from a plurality of sensors to a safety control;
wherein:
the plurality of sensors is configured to provide a signal corresponding to an environmental parameter, wherein the plurality of sensors operates in one of a normal state, an alarm or a fault state, wherein the signal corresponds to one of the normal state, or the alarm state or the fault state, wherein a value associated with the signal is predetermined;
the safety control is coupled to the plurality of sensors via a single wire, the safety control being configured to transmit serial data to the plurality of sensors and to receive serial data from the plurality of sensors via the single wire in the normal state, wherein the safety control is further configured to detect the alarm state or the fault state based on the signal in addition to decoding the serial data; and
the safety control is configured to determine a data bit associated with a time interval between changes in a voltage level detected on the single wire, the time interval constituting an interval between a rising edge and a falling edge of the voltage level;
wherein a sensor consistently controls a line until a second sensor takes control of the line from the sensor so that exactly one sensor controls the line at any given time.

15. The fault tolerant interface of claim 14, wherein control of the line is prioritized based on message importance.

16. The fault tolerant interface of claim 14, wherein control of the line permits multi-directional data transfer, and a sensor conditionally synchronously replies to data transmissions.

17. The fault tolerant interface of claim 16, wherein the reply is used to search for an optimal value, the optimal value is used for unique address assignment, and data is manipulated such that the calculation of the training pulse duration is based on average pulse widths of the first pulse and the second pulse.

18. The fault tolerant interface of claim 14, wherein three pulses are present including a first pulse and a second pulse being unconstrained multiples of a training pulse duration while a third pulse is a training pulse, and a dynamic process for communication of a parameter determination uses blips in data transmission.

* * * * *